March 14, 1944.　　K. WILFERT ET AL　　2,344,380
WHEEL SUSPENSION
Filed Oct. 8, 1941

INVENTORS:
KARL WILFERT AND
BELA BARENYI
by
ATTORNEYS

Patented Mar. 14, 1944

2,344,380

UNITED STATES PATENT OFFICE 2,344,380

WHEEL SUSPENSION

Karl Wilfert, Sindelfingen, and Béla Barényi, Vaihingen-Rohr, Germany; vested in the Alien Property Custodian Application October 8, 1941, Serial No. 414,147
In Germany June 19, 1940

4 Claims. (Cl. 180—73)

The present invention relates to a connection of a wheel suspension to the frame or body of a vehicle (rest of the vehicle) which is resilient in a plurality of directions. More particularly, the invention is concerned with a resilient connection of a wheel suspension or an axle aggregate with the frame or the car body of a motor vehicle consisting substantially in that, independent on the spring suspension of the wheel, resilient intermediate members are arranged between the members of the vehicle to be united, which intermediate members effect a resiliency in various directions. Preferably the intermediate members effecting resiliency in different directions are arranged one behind the other in the direction of the power transmission.

For the resilient connection rubber members of any suitable shape or also guided coiled springs may be used. The use of rubber sleeves is recommended particularly those which always provide for a main resiliency in the direction of their axis only. By employing a plurality of sleeves arranged one behind the other and at an angle to each other, a substantial resiliency in two or more directions may, however, be obtained according to the invention, whereby a corresponding selection of the sleeves a larger resiliency in the one main direction may be allowed than in the other main direction.

For instance the wheel suspension or the axle aggregate, having a resiliency substantially acting transversely to the direction of run, may be mounted at at least one intermediate member which in turn is fixed to the frame or the car body with a substantially vertical resiliency. This allows bearing of the springs, absorbing shocks acting upon the wheels, against the intermediate member in such a manner that the resilient members, for instance rubber sleeves, mainly effecting a resiliency in a transverse direction are not, or are in a reduced measure only, stressed by the weight of the car body or the forces of the springs respectively.

In the accompanying drawing one construction according to the invention is shown by way of example.

Figure 1:
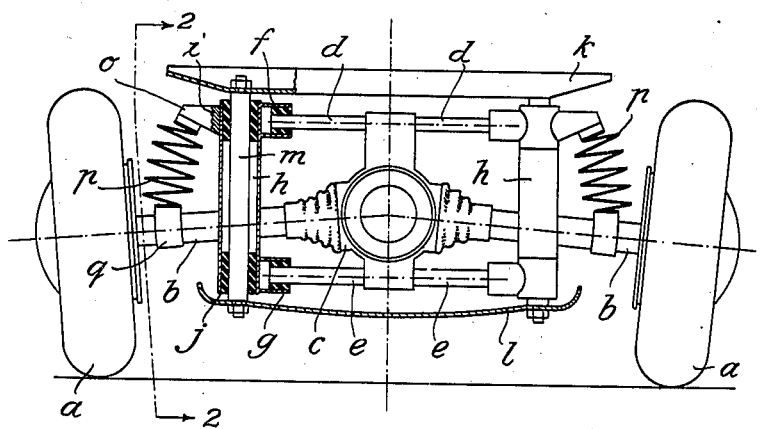
Fig. 1 shows a rear elevation of a rear axle, partially in section.
Figure 2:
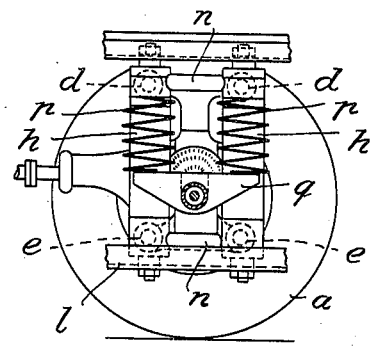
Fig. 2 is a section on the line 2—2 of Fig. 1 (side elevation).

The rear wheels $a$ are mounted upon oscillating half axles $b$ which are linked to the casing $c$ of the differential gear serving as axle support. Fixed to projections of the casing $c$ are two upper transverse rods $d$ and two lower transverse rods $e$ the ends of which are mounted by means of transversely arranged rubber sleeves $f$ and $g$ respectively in lateral tube-like projections of four vertical sleeves $h$. Each of these sleeves in turn is mounted by means of an upper rubber sleeve $i$ and a lower rubber sleeve $j$ upon a vertical support $m$ fixed to the frame or to suitable members $k$ and $l$ respectively of the car body. The sleeves $h$ may be connected together by transverse members to form a rigid unit. In the construction shown the two sleeves $h$ provided at each side of the vehicle are rigidly connected to each other by connecting tubes $n$, the oscillating half axles $b$ extending through the space between the sleeves and the connecting tubes. Each of the sleeves is provided with a spring bracket $o$ against which bears a coiled spring $p$ the lower end of which is fixed to a spring bracket $q$ provided at the oscillating half axle.

As may be seen, the differential gear casing may yield together with the oscillating half axles $b$, the rear wheels $a$ and the transverse rods $d$ and $e$ on the one hand substantially to the extent of the resiliency of the horizontal rubber sleeves $f$ and $g$ transversely to the direction of run, and on the other hand together with the sleeve $h$ substantially to the extent of the resiliency of the vertical rubber sleeves $i$ and $j$ in a vertical direction, each of the rubber sleeves simultaneously allowing a resiliency, but a small resiliency only, in other directions so that a metallic contact of the individual members is obviated. However, it would also be sufficient, for instance, if the vertical rubber sleeves only would allow a resiliency in all directions, and the horizontal rubber sleeves exclusively a resiliency transversely to the direction of run. As the spring brackets $o$ are provided at the sleeves $h$ which with regard to the car body may yield substantially in a vertical direction only, the rubber sleeves $f$ and $g$ are released to a substantial extent from the weight of the car body, viz. from the forces to be transmitted by the springs $p$ respectively, so that a weak resiliency of the axle aggregate in the transverse direction may be obtained.

In this case the use of non-guided coiled springs $p$ is of particular advantage in so far as these springs, in spite of their bearing against members which are not movable in a transverse direction, offer practically no resistance to resiliency in a transverse direction.

By the combination of a resiliency in a transverse direction with a resiliency in a vertical direction as proposed according to the invention, oscillating phenomena of the car body may be prevented in an effective manner by the use of simple and reliable resilient intermediate members. The invention is of particular importance in connection with gauge altering oscillating half axles. The transverse shocks occurring on deflection of the springs of the wheels are absorbed first of all by the transversely arranged rubber sleeves. The vertical rubber sleeves simultaneously allow an advantageous resiliency of the axle aggregate about a longitudinal axis of the vehicle.

The invention may be used also in connection with other axle constructions, for instance front axles.

Preferably the rubber sleeves are adhesively connected to the supports extending through them or to the metal sleeves enclosing them or to interposed metal sleeves serving for connecting purposes respectively. This may be done by vulcanization. The connection, however, may be effected in any other suitable manner.

The invention may be applied to rigid axles, preferably to oscillating axles and more especially to oscillating half axles. It may be applied to one or all axle aggregates of a vehicle. It is of course also possible to apply the invention to cars without a frame.

Having now particularly described and ascertained the nature of our said invention and in what manner the same is to be performed we declare that what we claim is:

1. A vehicle having an axle aggregate, a pair of chassis members, upright supports connecting said members, upright sleeves surrounding said supports, rubber rings connecting the extremities of said sleeves with said supports, tubular extensions adjacent each end of said sleeves, one of such extensions being arranged longitudinally of the vehicle and another laterally of the vehicle, the axle aggregate having upper and lower vertical projections, lateral arms extending in opposite directions from said projections with their free extremities entering said laterally arranged tubular extensions of said sleeves, and rubber cushions within such tubular extensions and surrounding the free ends of said lateral arms.

2. A vehicle as set forth in claim 1 wherein the axle aggregate comprises a differential gear case, a pair of oscillatable half-axles pivotally mounted thereon, and such vertical projections extend from such gear case.

3. A vehicle as set forth in claim 1 wherein said sleeves also carry projecting spring brackets and non-guided coiled springs are arranged between said axle aggregate and spring brackets.

4. A vehicle having oscillatable half-axles, a differential gear casing upon which the inner ends of said half-axles are pivoted, upper and lower projections on said gear casing having pairs of lateral arms extending therefrom in opposite directions, a pair of chassis members, upright supports connecting said members and arranged in spaced pairs on opposite sides of said axles, and means for cushioning said vehicle parts, comprising vertically arranged sleeves carrying internal rubber rings at their extremities, which rubber rings are also secured to said supports, tubular extensions extending laterally from the ends of said sleeves in position to receive the free extremities of said lateral arms, and rubber cushioning members arranged within such tubular extensions and surrounding the ends of said lateral arms.

KARL WILFERT.
BÉLA BARÉNYI.